Figure 2:
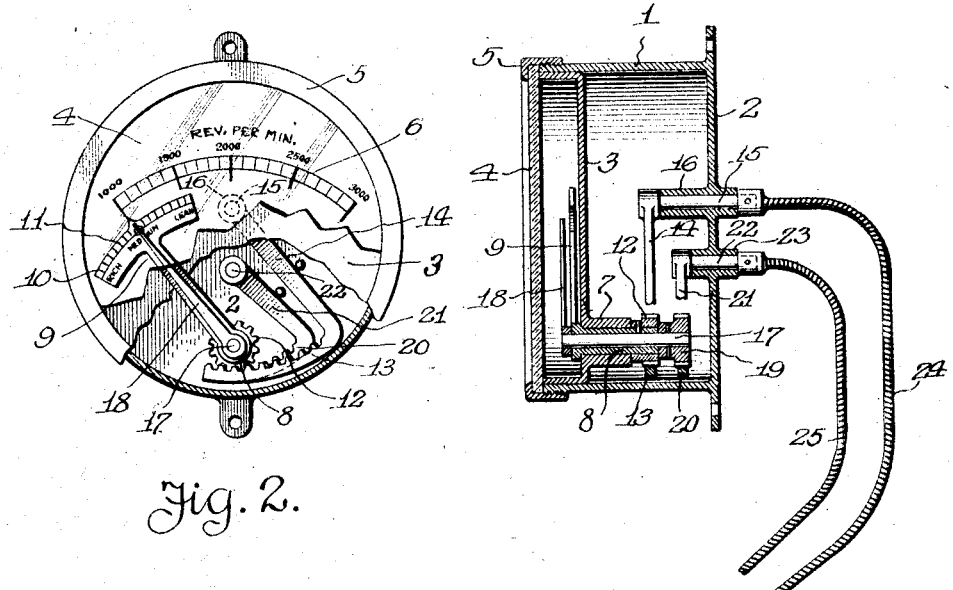

G. HORVATH.
FUEL ECONOMIZING DEVICE.
APPLICATION FILED DEC. 15, 1919.

1,377,963. Patented May 10, 1921.

Inventor
Geza Horvath,
By
Attorneys

UNITED STATES PATENT OFFICE.

GEZA HORVATH, OF HIGHLAND PARK, MICHIGAN.

FUEL-ECONOMIZING DEVICE.

1,377,963.　　　　　Specification of Letters Patent.　　Patented May 10, 1921.

Application filed December 15, 1919. Serial No. 345,012.

*To all whom it may concern:*

Be it known that I, GEZA HORVATH, a citizen of the United States of America, residing at Highland Park, in the county of Wayne and State of Michigan, have invented certain new and useful Improvements in Fuel-Economizing Devices, of which the following is a specification, reference being had therein to the accompanying drawings.

In my companion application, filed under even date, there are disclosed means by which the fuel supply to an internal combustion engine may be regulated in proportion to the duty of the engine, so as to economize in fuel and insure a smooth operation of the engine, under varying loads or duties, said means including a manually actuated valve and a speed governor actuated valve coöperating therewith, said valves and the actuating means thereof permitting of the speed of the engine and the nature of the fuel supplied to the engine being ascertained, so that the operator of an automobile equipped with my invention may make adjustments or changes to rectify any imperfect actions about the automobile or its engine. To determine the speed of the engine and the nature of the explosive mixture applied thereto, an indicator is employed, and the present invention relates to an indicator of novel construction that may be advantageously used in connection with the fuel regulating means mentioned above and disclosed in my companion application.

The subject matter of this application will be hereinafter considered in detail and then claimed, and reference will now be had to the drawing, wherein—

Figure 1:
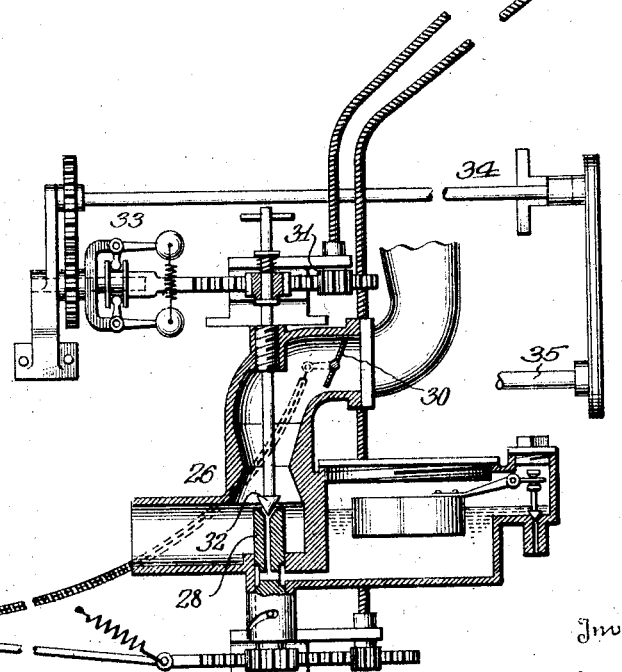

Figure 1 is a vertical longitudinal sectional view of an indicator showing its connection with fuel regulating means, and Fig. 2 is a front elevation of the indicator partly broken away and partly in section.

In the drawing, the reference numeral 1 denotes a cylindrical casing or shell having a rear wall 2 by which the casing may be suitably connected to the control board or dash of an automobile or any other suitable support.

Set in the open end of the casing or shell is a fixed dial 3 and closing the open end of said casing is a transparent plate 4 that may be held in engagement with the casing by a retaining ring 5 screwed or otherwise mounted on said casing. The dial 3 has its outer face calibrated or provided with indicia 6 to indicate the revolutions per minute or the speed of an engine shaft or some part driven thereby, the indicia being preferably located on the upper portion of the fixed dial. The lower portion of the fixed dial 3 has a rearwardly extending bearing 7 for a sleeve 8 and the front end of said sleeve is provided with a combined pointer and dial 9 which may be moved relative to the indicia 6 by rocking the sleeve 8. The combined pointer and dial includes a segment shaped member 10 which is calibrated and provided with indicia 11 relating to the nature of an explosive mixture, for instance, whether the mixture is rich, lean or medium in its constituent elements. The pointer is intermediate the ends of the member 10 and when said member is swung across the dial, the pointer is in proper relation to the indicia 6 of the fixed dial to serve as a pointer therefor.

Mounted on the rear end of the sleeve 8 is a pinion 12 meshing with the rack portion 13 of an arm or crank 14 mounted on the front end of a shaft 15, journaled in a long bearing 16 forming part of the rear wall 2.

Journaled in the sleeve 8 is a shaft 17 having the front end thereof provided with a pointer 18 which is movable in front of the combined movable dial and pointer 9 and is adapted to serve in connection with the indicia 11 on the member 10 in denoting the nature of an explosive mixture.

The rear end of the shaft 17 has a pinion 19 meshing with the rack 20 of an arm or crank 21 mounted on a shaft 22, journaled in a short bearing 23 forming part of the rear wall 2.

Suitably connected to the rear ends of the shafts 15 and 22 are flexible shafts or members 24 and 25 respectively and these flexible shafts extend to a fuel regulating mechanism associated with a carbureter 26 forming part of the fuel supply system of an internal combustion engine.

The shaft 24 may have movement imparted thereto through the medium of a rack and pinion, generally designated 27, associated with an accelerator valve 28 operated through the medium of a pedal or treadle 29 which is also connected to a throttle 30 forming part of the carbureter 26. The shaft 25 may have movement imparted thereto by a rack and pinion, generally designated 31 associated with a governor valve 32 actuated from a governor 33 driven by a suitable power transmission mechanism, generally designated 34, from a cam shaft 35 or some other driven part of an internal combustion engine (not shown).

As pointed out in my companion application the valves 28 and 32 coöperate in regulating the supply of fuel to the carbureter 26, and the supply of fuel to an engine in proportion to its speed or duty expected of the engine. The movement of the valve 28 relative to the valve 32 is transmitted to the indicator so that the movable dial and pointer may coöperate with the pointer 18 in indicating the nature of the fuel entering the carbureter, and since the shaft 25 has movement imparted thereto from the engine it is possible for the combined pointer and dial to indicate, relative to the fixed dial, the speed at which the engine is operating.

I attach considerable importance to the double function of the indicator and the compact constructive arrangement of parts, and while the indicator has been especially designed for my fuel regulator, it is to be understood that it may be used for various purposes by simply changing the indicia thereon.

What I claim is:—

1. Means for determining the speed of an engine having a carbureter and the nature of the fuel mixture supplied to the engine by the carbureter, comprising an indicator having a fixed dial provided with indicia, a combined dial and pointer movable relative to said fixed dial, a pointer movable relative to said combined dial and pointer, and means for separately moving said pointers, said means including concentric shafts and racks and pinions for imparting movement to said shafts.

2. Means for determining the speed of an engine having a carbureter and the nature of the fuel mixture supplied to the engine by the carbureter, comprising an indicator having a fixed dial provided with indicia disposed in an arc at the upper portion of said dial, a pointer movable relative to said fixed dial and provided with indicia disposed in an arc adjacent the indicia of the fixed dial, a pointer movable relative to the indicia of the first mentioned pointer, means in a common axis at the lower portion of said fixed dial for supporting said pointers, said means including concentric flexible shafts for operating said pointers.

3. An indicator comprising a casing, a fixed dial in said casing, a combined dial and pointer movable relative to said fixed dial, a pointer movable relative to the combined dial and pointer, and means for independently operating said pointers, said means including flexible shafts and operating connections to said shafts.

In testimony whereof I affix my signature in the presence of two witnesses.

GEZA HORVATH.

Witnesses:
KARL H. BUTLER,
ANNA M. DORR.